L. W. BOYNTON.
APPARATUS FOR PREPARING PEAT FOR FUEL.
No. 62,469. Patented Feb. 26, 1867.
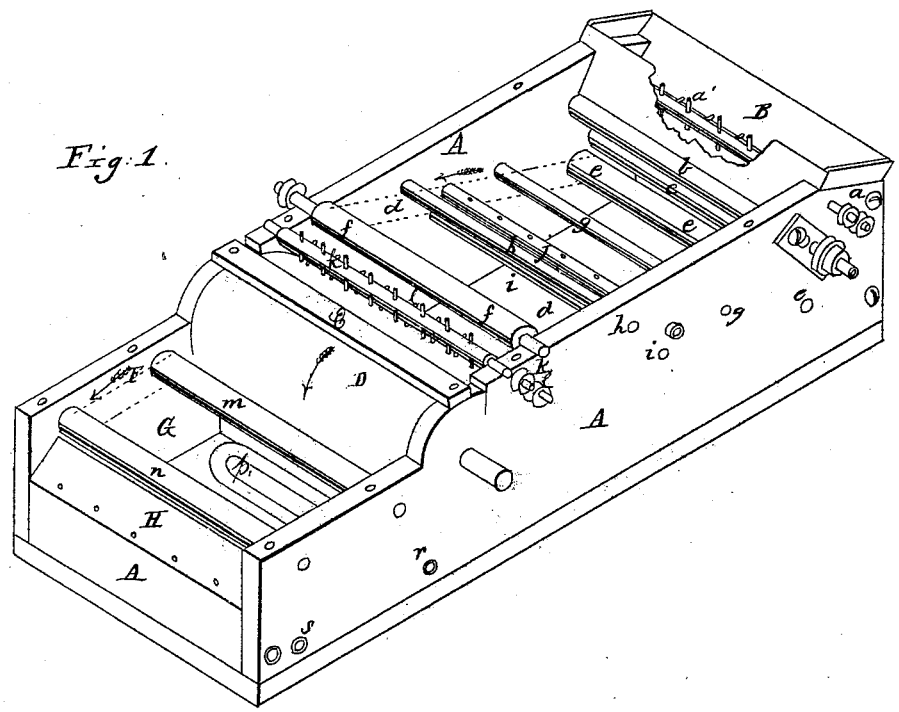
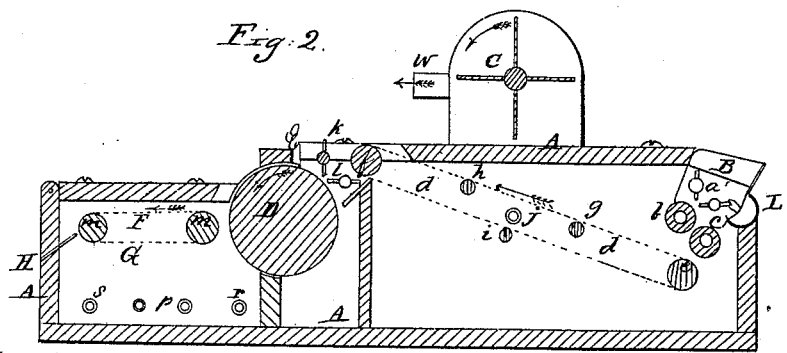
Witnesses:
Cyprian Miller
R. Fitzgerald
Inventor
L. W. Boynton

United States Patent Office.

LEANDER W. BOYNTON, OF HARTFORD, CONNECTICUT.

*Letters Patent No. 62,469, dated February 26, 1867.*

---

IMPROVED APPARATUS FOR PREPARING PEAT FOR FUEL.

---

*The Schedule referred to in these Letters Patent and making part of the same.*

---

TO ALL WHOM IT MAY CONCERN:

Be it known that I, LEANDER W. BOYNTON, of the city and county of Hartford, in the State of Connecticut, have invented a new and useful improvement in Machinery or Apparatus for Preparing Peat for Fuel; and I do hereby declare that the following is a full, clear, and exact description of the construction, character, and operation of the same, reference being had to the accompanying drawings, which make part of this specification, in which—

Figure 1 is a perspective view of the machine or apparatus with the cover removed showing the internal parts.

Figure 2 is a longitudinal section of the same, cut vertically through the centre, showing the several parts in their relative positions.

My improvement consists in the use of spurred rollers, &c., to tear up or loosen the peat; two or more cylinders revolving with unequal velocity, so as to grind the peat as it passes through; an endless apron to carry the peat through the steam chamber; a perforated steam pipe through which I admit high steam to dry the peat; a fan to exhaust the air, &c., from the steam chamber; spurred rollers to again break up or loosen the peat; a cylinder with moulds in its convex surface in which pistons work from the centre to press the peat against a bar; and an endless apron to carry the bricks or blocks of dried and pressed peat through the warm-air chamber from which it will fall into a suitable receptacle.

I make the box A A A, which contains the whole apparatus, of cast iron or any other suitable material, substantially in the form represented in fig. 1, and indicated in section in fig. 2. At the right-hand end of this box A A A I fit a suitable hopper, with a steam chamber near the bottom, as B, to receive the newly dug or unprepared peat and discharge it into the working machinery to be prepared for fuel. I make the spurred rollers as represented at $a\ a'$, and revolve them by belts as indicated by pulleys, at $a$, fig. 1, or by gear-wheels, so as to tear up or loosen the new dug peat; or, one roller and a spurred apron may be used. I make the grinding cylinders $b$ and $c$ of cast iron, or any other suitable material, of the same diameter, and, by means of belts or gear-wheels, revolve them in different times, or make them of different diameters and revolve them in equal times, so as to produce not only a pressing but grinding operation. I fit an endless apron, as indicated by red dots at $d\ d$, figs. 1 and 2, which I run on rollers, as $e$ and $f$, and steady it by the rollers $g\ h\ i$, to carry the peat forward through the steam chamber. Centrally and within this apron $d\ d$, I place a perforated steam pipe as $j$, (figs. 1 and 2,) at either or both ends of which I introduce high steam, (say four to six or more atmospheres,) so that its superabundant heat will convert the moisture in the peat into steam, when the whole of the steam will be carried off by its own levity and pressure, and the effect of the exhaust fan C in the cupola, as shown in fig. 2. I make the spurred rollers $k$ and $l$ in the usual way, as represented in figs. 1 and 2, and revolve them inwardly to break and pulverize the partially dried peat before it falls into the moulds in the cylinder D. I make the moulding cylinder D with its rows of moulds, pistons, cams, &c., substantially as described and set forth in my patent for making mould sugar, issued December, 27, (antedated 15,) 1864, causing the pistons to press the rows of blocks against a bar, as E, figs. 1 and 2. (Or, I use another cylinder, as described in my before-mentioned patent.) I make the endless apron F in the usual way, and work it on rollers, as $m$ and $n$, to carry the blocks from the moulding and pressing cylinder D, through the warm-air chamber G, to complete the desiccation of the peat. To heat this chamber G, I insert a tube to pass in a zigzag way, as indicated at $p$, figs. 1 and 2, from $r$ to $s$, into which I introduce steam or hot air, as convenience may require. And, if thought best, any or all of the rollers may be made hollow and filled with steam or hot air, especially in cold weather to thaw out the work, or keep it from freezing at night, or to warm it for general purposes. Having made the several parts and arranged them as before described, I put the machine in motion by any convenient power, admit the high steam into the perforated pipe or tube $j$, (at either or both ends,) and let steam or hot air into either end, $r$ or $s$, of the zigzag pipe $p$. I then put the newly dug peat into the hopper B, when the spurs on the rollers $a\ a'$, (or roller and apron,) will tear up and loosen the peat and allow it to fall between the rollers $b$ and $c$, where, by the unequal motion of their surfaces, the peat will be pressed and ground into a homogeneous mass and fall upon the endless apron $d\ d$, which will carry it up to the next spur-rollers $k$ and $l$, while the high steam admitted through the perforated tube $j$, will, by its superabundant heat, convert the moisture in the peat into steam, which will all be carried off through the outlet or eduction spout $w$, so that the peat will be as dry as the steam used, and in a good condition for moulding. In this condition it will fall into the moulds in the surface of the moulding cylinder D, and, when any one of the rows of moulds come under the bar E, the pistons will be forced outward so as to press the peat into a solid block, and as the row passes the bar E, the piston will force the block out onto the endless apron F, by which it will be carried through the dry-air chamber, and fall out upon the slide H ready for use or market. Thus, the whole work is done in the most efficient manner, at very little expense and in a very brief space of time. As a more particular description of the hopper B, I make the spurred apron or lower portion of the rear part hollow, as represented at L, fig. 2, to receive steam to keep that part of the machine warm when so needed.

What I claim as my invention, and desire to secure by Letters Patent, is—

1. The combination of the grinding cylinders $c$ and $b$, with the spurred rollers, (or roller and spurred apron,) and hopper B, and when they are constructed, arranged, and fitted for use, substantially as herein described and set forth.

2. I claim the combination of the perforated pipe $j$ for the high steam, with the apron $d\,d$, and the exhaust fan C, when they are constructed, arranged, and fitted for carrying and drying the peat, substantially as herein described and set forth.

3. I claim the moulding and pressing cylinder D, (as described in my patent issued December 27, 1864,) in combination with the apron F, and zigzag pipe $p$, when they are constructed, arranged, and fitted for moulding, pressing, and drying peat, substantially as herein described and set forth.

L. W. BOYNTON.

Witnesses:
   CYPRIAN WILLCOX,
   R. FITZGERALD.